Dec. 14, 1965     J. F. PAULSON     3,223,614
DECOLORIZATION OF WAXES BY DIALYSIS
Filed May 14, 1962
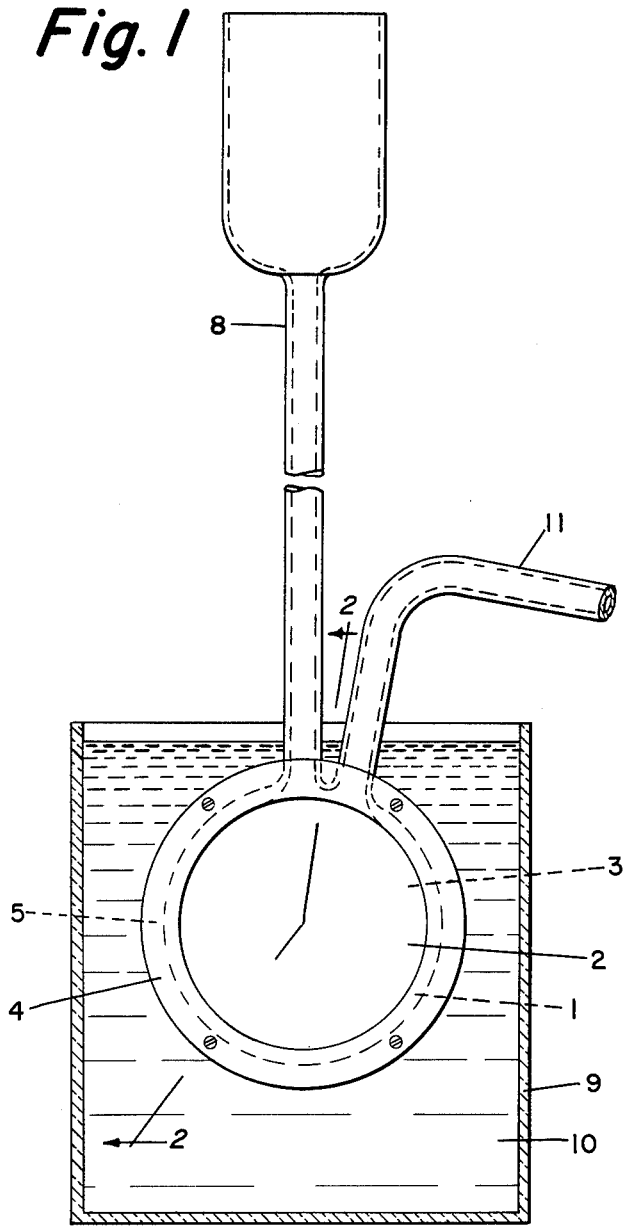
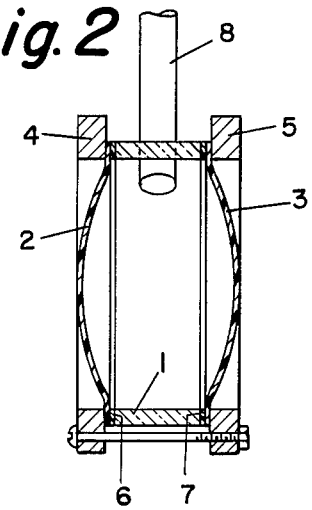
INVENTOR:
JOSEPH F. PAULSON
BY *George L. Church*
ATTORNEY 3,223,614
DECOLORIZATION OF WAXES BY DIALYSIS
Joseph F. Paulson, Claymont, Del., assignor to Sun Oil Company, Philadelphia, Pa., a corporation of New Jersey
Filed May 14, 1962, Ser. No. 194,315
2 Claims. (Cl. 208—24)

This invention relates to the decolorization of petroleum waxes and more particularly to the decolorization of wax by dialysis.

Dialysis is the separation of solutes by means of their unequal diffusion through membranes or diaphragms. The term denotes the separation of colloids from non-colloids.

I have found that dialysis may be used to decolorize wax when membranes of a certain type are employed.

Generally speaking the process involves partitioning a suitable vessel to obtain two bodies of liquid separated by the dialyzing membrane or film. The undialyzed liquid comprises wax—which contains color bodies—dissolved and dispersed in a solvent and the dialyzate passes through the membrane into a receiving solvent. Diffusion rate is usually improved by heating the cell and a temperature differential between the undialized liquid and the receiving solvent can be used if desired. Any suitable arrangement of apparatus can be used—either the bag type or the compartment type being satisfactory. A pressure differential across the membrane can be used if desired.

The decolorizing process can be applied to petroleum waxes generally including slack wax, scale wax, petrolatum wax and particularly to microcrystalline waxes which are of an undesirable color i.e. yellow, brown, amber or black. These waxes have melting points ranging from 100–200° F.

The wax is dissolved in a non-polar solvent. Suitable solvents include hydrocarbons such as normal paraffins having from 2 to 12 carbon atoms, cycloparaffins, olefins and aromatic hydrocarbons having 6 to 10 carbon atoms. Chlorinated hydrocarbons can also be used. The solvent is non-selective for the color bodies in the wax and the solution passes through the membrane by a physical interaction between the solute, solvent and membrane or by a mechanical sieve action. Particularly suitable solvents include n-pentane, n-hexane, n-heptane, cyclohexane, benzene, toluene, xylene and propylene trimer. The solvent is used in amounts ranging from 5 weight percent to 25 weight percent based on the wax. The receiving solvent is usually the same as the dissolving solvent. It can be circulated if desired. Polar solvents cannot be used because they are essentially insoluble in the film and permeation rates are too low. Solvents such as low molecular weight alcohols, ethers, esters and ketones are unsatisfactory.

The cell can be operated at temperatures ranging from about 20° C. to about 175° C. Higher temperatures—up to 300° C. can be used with irradiated (crosslinked) polymer films. Pressure can be from 15–1000 p.s.i. but the pressure differential across the film must be relatively low i.e. 0–10 p.s.i.

The membrane must provide a good diffusion rate and be strong enough to stand the conditions of the process. I have found that polypropylene films having a high crystallinity have good permeability and selectivity for waxes. Crystallinity of polymer films can be defined by density and by solubility. The non-crystalline or incompletely crystalline components of polypropylene are soluble in normal hydrocarbon solvents and the usual standard is the solubility in n-hexane at reflux temperature. I have found that polypropylene films having a maximum extractable fraction of .1 to 50 weight percent, preferably .1 to 6.4 weight percent, when extracted with n-hexane at reflux temperature are efficient for removing color bodies from paraffin wax. Then density of the film ranges from .87 to .92. Suitable film thicknesses ranging from 0.05 to 10 mils can be used with 1.0 to 5.0 mils being preferred. The films are made from polypropylene prepared by polymerization of propylene in the presence of a Ziegler-type polymerization catalyst. The films can be extruded or cast and can be mono or biaxially oriented by stretching. Prior to use the film can be treated with hydrocarbon solvents—with or without heating as a preconditioning step.

The apparatus used for the specific examples which follow in shown in the drawing in which FIG. 1 in a front view and FIG. 2 is a partial side view taken along line 2—2 of FIG. 1. The membrane holder consisted of a $\frac{9}{16}''$ thick glass ring 1 having an inside diameter of about 1.8'' and a width of about $\frac{1}{2}''$. Two polypropylene membranes 2 and 3 were held in position over the sides of the ring by metal rings 4 and 5. The rings had internal Teflon gaskets, 6 and 7. The inner diameter of the metal rings was approximately the same as the diameter of the glass ring and thus the two polypropylene membranes had a surface area of approximately 6.0 square inches available for dialysis. The wax and solvent were introduced through tube 8. The membrane holder was immersed in a vessel 9 containing the receiving solvent 10. Since a part of the receiving solvent passed through the membranes into the wax-solvent mixture an over flow tube 11 was employed. The receiving solvent was heated by an electric heating device, not shown and stirred magnetically. The temperature was maintained in the range of 70–90° C. and the length of the runs was about 1–4 hours. The runs were at ambient pressure.

*Example 1*

6.2 grams of yellow wax having an NPA color (ASTM D155–45T) of 1.75, a melting point of 153° F. and a specific gravity (60° F.) of 0.928 was dispersed in n-heptane and introduced into the apparatus described above. n-Heptane was used as the receiving solvent. The solution was dialyzed through a 4 mil. food grade polypropylene film having a maximum extractable fraction of less than 6.4% (n-hexane), a density of 0.89 and a tensile strength (MD) of 5700 p.s.i. Dialysis was continued for 3 hours at 90° C. The dialyzed wax was recovered from the receiving solvent by evaporation. 2.4 gms. of white wax having an NPA color of 0.75 was recovered. The product mounted to 31 weight percent of the feed.

*Example 2*

7.8 grams of dark brown wax having an NPA color of 5 (diluted) was dialyzed through a 4.5 mil. polypropylene film for 3½ hours at 70–90° C. 1.8 gms. of cream colored wax was recovered (23%) having an NPA color of 0.75.

*Example 3*

6.3 grams of black wax having a melting point of 193° F., a specific gravity (60° F.) of 0.943 and an NPA color of 7.5 (diluted) was dispersed in n-heptane and dialyzed for 3½ hours at 90° C. through at 1 mil. polypropylene film. 2.2 grams (35%) of yellow wax having an NPA color of 1.75 was recovered.

Similar results are obtained using solvents such as benzene and propylene trimer—an olefinic hydrocarbon solvent as well as other paraffin solvents.

Thus it can be seen that dialysis is an effective method for decolorizing wax.

The invention claimed is:
1. Process of decolorizing petroleum wax which comprises dialyzing a solution of the wax in a hydrocarbon solvent through a polypropylene film, said film having a specific gravity of .87–.92 and having a maximum extractable fraction of .1 to 50 weight percent when extracted with n-hexane at reflux temperature.

2. Process of decolorizing microcrystalline wax which comprises dialyzing a solution of the wax in a paraffin hydrocarbon solvent through a polypropylene film, said film having a specific gravity of .87–.92 and having a maximum extractable fraction of .1 to 50 weight percent when extracted with n-hexane at reflux temperature.

References Cited by the Examiner

UNITED STATES PATENTS

| | | | |
|---|---|---|---|
| 2,168,330 | 8/1939 | Ferris | 208—24 |
| 2,651,655 | 9/1953 | Loughran | 208—24 |
| 2,984,623 | 5/1961 | Lee | 260—674 |
| 3,062,905 | 11/1962 | Jennings et al. | 260—674 |

DELBERT E. GANTZ, *Primary Examiner.*

ALPHONSO D. SULLIVAN, *Examiner.*